US006560225B1

(12) United States Patent
Czajkowski et al.

(10) Patent No.: US 6,560,225 B1
(45) Date of Patent: May 6, 2003

(54) ENHANCED PERFORMANCE VODSL

(75) Inventors: Igor K. Czajkowski, Bishop's Stortford (GB); Leslie D. Humphrey, Harlow (GB); Christopher N. Tate, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/437,517

(22) Filed: Nov. 10, 1999

Related U.S. Application Data (63) Continuation-in-part of application No. 09/375,760, filed on Aug. 18, 1999.

(51) Int. Cl.$^7$ .............................................. H04L 12/66
(52) U.S. Cl. ...................................................... 370/356
(58) Field of Search ........................ 370/356, 351–354, 370/228–230, 238, 465–468, 371–377, 386–389; 379/93.25, 90.01, 93.01, 9, 27.01, 27; 375/235, 286; 455/403, 450, 433

(56) References Cited

U.S. PATENT DOCUMENTS

| | | | | | |
|---|---|---|---|---|---|
| 5,940,759 | A | * | 8/1999 | Lopez-Torres et al. | 455/433 |
| 5,991,292 | A | * | 11/1999 | Focsaneanu et al. | 370/352 |
| 6,118,777 | A | * | 9/2000 | Sylvain | 370/351 |
| 6,272,209 | B1 | * | 8/2001 | Bridger et al. | 379/27 |
| 6,347,075 | B1 | * | 2/2002 | Barzegar et al. | 370/228 |

OTHER PUBLICATIONS

Hauwermeiren Van L et al: "Offering Video Services Over Twisted Pair Cables to the Residential Subscriber by means of an ATM based ADSL Transmission System" Proceedings of the International Switching Symposium, De, Berlin, VDE Verlay, vol. SYMP. 15, Apr. 23, 1995, pp. 447–451.

Brackett P et al: "Interworking Broadband Networks and Services Using ATM" Proceedings of the Global Telecommunications Conference (Globecom) US, New York, IEEE, Nov. 29, 1993, pp. 1849–1853.

Kwok TC: "Residential Broadband Architecture Over ADSL and G. Lite (G.992.2): PPP Over ATM" IEEE Communications Magazine, US, IEEE, Service Center, Piscataway, N.J, vol. 37, No. 5, May 1999, pp. 84–89.

Electronics & Communication Engineering Journal, Jun. 1999—High–speed Copper Access: A Tutorial Overview by I K Czajkowski, pp. 125–148.

* cited by examiner

*Primary Examiner*—Kwang Bin Yao
*Assistant Examiner*—Prenell Jones
(74) *Attorney, Agent, or Firm*—Lee, Mann, Smith, McWilliams, Sweeney & Ohlson (57) ABSTRACT

Voice over Digital Subscriber Line (VoDSL) is an emerging technology, and as such requires subscriber acceptance and take-up both for the future development of this technology and to repay access network operator investment in VoDSL equipment. The present invention provides an improved equipment architecture and improved methods of separating VoDSL equipment to enhance performance and/or enable the provision of improved services. In one aspect the invention provides a Digital Access System (DAS) Customer Premises Equipment (CPE) comprising: an internal packet switched network comprising a switch; a DAS modem connected to said internal network and arranged such that in use the internal network is coupled to an external packet switched network by a DAS link over an access network; a controller arranged to control said switch in order to establish packet transfer paths between said modem and one or more internal network interfaces to customer appliances connected to the CPE in order to complete calls between said appliances and entities on the external network; wherein the CPE is arranged to reconfigure parameters corresponding to a first layer dependent on parameters corresponding to a second layer.

30 Claims, 5 Drawing Sheets

ENHANCED PERFORMANCE VODSL

This application is a continuation-in-part of copending U.S. patent application Ser. No. 09/375,760, filed Aug. 18, 1999.

FIELD OF THE INVENTION

The present invention relates to communications access networks, and in particular to Voice-over Digital Subscriber Line customer premises equipment and services provision.

Reference is made to applicants co-pending applications of the same date and titled "Improved VoDSL Service Provision" (our reference 10868ID: Czajkowski) and "Enhanced VoDSL Service Provision" (our reference 10850ID: Czajkowski). The contents of these applications are intended to be incorporated herein.

BACKGROUND OF THE INVENTION

Telephone access networks have historically always been connection orientated, typically using dedicated copper wire circuits between subscribers and the exchange or central office. Typically these access networks were designed to carry only voice with a bandwidth of less than 4 kHz. However in recent years with the growth of the internet and demand for other multi-media services such as video-on-demand and video conferencing, subscribers of telephone companies have demanded additional bandwidth over the access network to provide adequate internet and multi-media services access.

The Integrated Services Digital Network (ISDN) protocol was developed as an access network architecture for delivering all types of services including voice, data and video for example. Although ISDN provides a single access technology, it is limited by offering only "narrow band" communications speeds and relatively high pricing for terminal equipment and network access. This, together with the lack of "imaginative" residential services that could capitalize on the underlying bandwidth capacity, has seen the technology being confined to larger business customers.

Digital Subscriber Line (DSL) modem technology has enabled the transmission of digital information at duplex rates from 144 Kbits/s to over 1 Mbits/s over the local subscriber loop consisting of unshielded twisted pair cable. Reference is made to IEE Electronics Communication Engineering Journal, Vol. 11, No. 3, Page 125 (June 1999) for additional background on DSL technology. The demand for additional telephone lines and integrated telephony and data services has given rise to voice-over DSL (VoDSL) solutions, which use modem technologies to deliver services in-band over a single physical line. For example, a VoDSL offering may provide a Customer Premises Equipment (CPE) functionality with 4 POTS (Plain Old Telephony Service) ports, each with a unique telephone number, and an ethernet port for high speed data access to an Internet Service Provider (ISP). All the POTS (typically voice or fax conduits) lines are provided as digitally derived services. VoDSL is an emerging technology, and as such requires subscriber acceptance and take-up both for the future development of this technology and to repay access network operator investment in the VoDSL equipment.

SUMMARY OF THE INVENTION

It is an object of the present invention to provide improved VoDSL equipment functionality and performance.

It is a further object of the present invention to provide improved quality of service for derived voice telephony calls provided over a DSL link, above that normally available with VoDSL.

It is a further object of the present invention to provide the subscriber of VoDSL access networks with improved services capability.

In a first aspect the present invention provides Digital Access System (DAS) Customer Premises Equipment (CPE) comprising:

an internal packet switched network comprising a switch;
a DAS modem connected to said internal network and arranged such that in use the internal network is coupled to an external packet switched network by a DAS link over an access network;
a controller arranged to control said switch in order to establish packet transfer paths between said modem and one or more internal network interfaces to customer appliances connected to the CPE in order to complete calls between said appliances and entities on the external network;
wherein the CPE is arranged to reconfigure parameters corresponding to a first layer dependent on parameters corresponding to a second layer.

Preferably said DAS is Voice over Digital Subscriber Line (VoDSL).

Preferably one of said layer is the physical layer.

Preferably said CPE further comprises means for enabling cross-layer cognizance between the modem and the controller in order to optimize quality of service for one or more derived digital embedded voice calls carried by said DSL link CPE performance.

Preferably said cross-layer cognizance means comprises means for forwarding packet transfer path and/or voice call state information from the controller to the modem and forwarding DSL link information from the modem to the controller.

Preferably said forwarding means comprises an application programmers interface enabling function associated with the modem and a corresponding application programmers interface enabling function associated with the controller which together form an application programmers interface (API).

Preferably said API is established over a packet transfer path on said internal network.

Preferably said cross-layer cognizance means comprises a computer function arranged to reconfigure the modem and the controller dependent on said forwarded information.

Preferably said CPE comprises said computing function.

Alternatively said computing function is external to said CPE. Preferably said computing function is associated with a Personal Computer connected to said network-data interface.

Preferably said controller is a control processor.

Preferably one of said layers is the link layer. Preferably said link layer is ATM.

Preferably one of said layer is a layer corresponding to end to end voice call control and admission across said DSL link.

In a second aspect the present invention provides DAS Line Terminating Equipment (LTE) comprising:

an internal packet switched network comprising a switch and forming part of an external packet switched network;
a DAS modem connected to said internal network and arranged such that in use the internal network is coupled to a Customer Premises Equipment (CPE) internal packet switched network by a DAS link over an access network;
a controller arranged to control said switch in order to establish packet transfer paths between said modem and gateways or destinations on the external network;

wherein the LTE is arranged to reconfigure parameters corresponding to a first layer dependent on parameters corresponding to a second layer.

Preferably said DAS is VoDSL.

Preferably one of said layers is the physical layer.

Preferably said LTE further comprises means for enabling cross-layer cognizance between the modem and to the controller in order to optimize LTE performance.

Preferably one of said layers is the link layer. Preferably said link layer is ATM.

Preferably one of said layers is a layer corresponding to end to end voice call control and admission across said DSL link.

In a third aspect the present invention provides an access network comprising:
- a physical medium connecting DAS Line Terminating Equipment (LTE) to Customer Premises Equipment (CPE);
- said LTE comprising:
  - an internal packet switched network comprising a switch and forming part of an external packet switched network;
  - a DAS modem connected to said internal network and arranged such that the internal network is coupled to a CPE internal packet switched network by a DAS link over said physical medium;
  - a controller arranged to control said switch in order to establish packet transfer paths between said modem and gateways or destinations on the external network;
  - wherein the LTE is arranged to reconfigure parameters corresponding to a first layer dependent on parameters corresponding to a second layer; and
- said CPE comprising:
  - said CPE internal packet switched network comprising a CPE switch;
  - a CPE DAS modem connected to said CPE internal network and arranged such that the CPE internal network is coupled to said external packet switched network by said DAS link over said physical medium;
  - a CPE controller arranged to control said CPE switch in order to establish packet transfer paths between said CPE modem and one or more internal network interfaces to customer appliances connected to the CPE in order to complete calls between said appliances and entities on the external network;
  - wherein the CPE is arranged to reconfigure parameters corresponding to a third layer dependent on parameters corresponding to a fourth layer.

Preferably said DAS is VoDSL.

Preferably said third layer is said first or second layer and wherein said fourth layer is said second or first layer.

In a fourth aspect of the present invention provides an improved method of operating a VoDSL CPE or LTE comprising:
- an internal packet switched network comprising a switch;
- a DSL modem connected to said internal network and arranged such that in use the internal network is coupled to an external packet switched network by a DSL link over an access network;
- a controller arranged to control said switch in order to establish packet transfer paths between said modem and one or more internal network interfaces to customer appliances connected to the CPE in order to complete calls between said appliances and entities on the external network;

the method comprising:
- determining parameters corresponding to a first layer;
- reconfiguring parameters corresponding to a second layer dependent on said first layer parameters.

In a further aspect the present invention provides a method of operating a VoDSL CPE or LTE for delaying modem retraining when voice calls in progress, said CPE comprising:
- an internal packet switched network comprising a switch;
- a DSL modem connected to said internal network and arranged such that in use the internal network is coupled to an external packet switched network by a DSL link over an access network;
- a controller arranged to control said switch in order to establish packet transfer paths between said modem and one or more internal network interfaces to customer appliances connected to the CPE in order to complete calls between said appliances and entities on the external network;

the method comprising:
- determining whether the margin has fallen below a first predetermined threshold;
- if so, determining whether voice calls are in progress;
- if not, begin retraining;
- if, so determining whether margin has fallen below a second predetermined threshold;
- if so, begin retraining.

In a further aspect, the present invention provides a Digital Access System (DAS) Customer Premises Equipment (CPE) comprising:
- a Digital Subscriber Loop (DSL) physical layer;
- a packet switching layer; and
- a data/voice layer, wherein said CPE is arranged to reconfigure parameters corresponding to a first of said layer dependent on parameter corresponding to a second of said layer.

In a further aspect, the present invention provides a DAS Line Terminating Equipment (LTE) comprising:
- a Digital Subscriber Loop (DSL) physical layer;
- a packet switching layer; and
- a data/voice layer, wherein said CPE is arranged to reconfigure parameters corresponding to a first of said layer dependent on parameter corresponding to a second of said layer.

In a further aspect, the present invention provides a DAS network comprising CPE and LTE each comprising:
- a Digital Subscriber Loop (DSL) physical layer;
- a packet switching layer; and
- a data/voice layer, wherein said network is arranged to reconfigure parameters corresponding to a first layer of one of said CPE and LTE dependent on a parameter corresponding to a second layer of one of said CPE and LTE.

BRIEF DESCRIPTION OF THE DRAWINGS

In order that a greater understanding of the invention can be obtained, embodiments of the invention will now be described with reference to the accompanying drawings, by way of example only and without intending to be limiting, in which.

DETAILED DESCRIPTION

Figure 1:
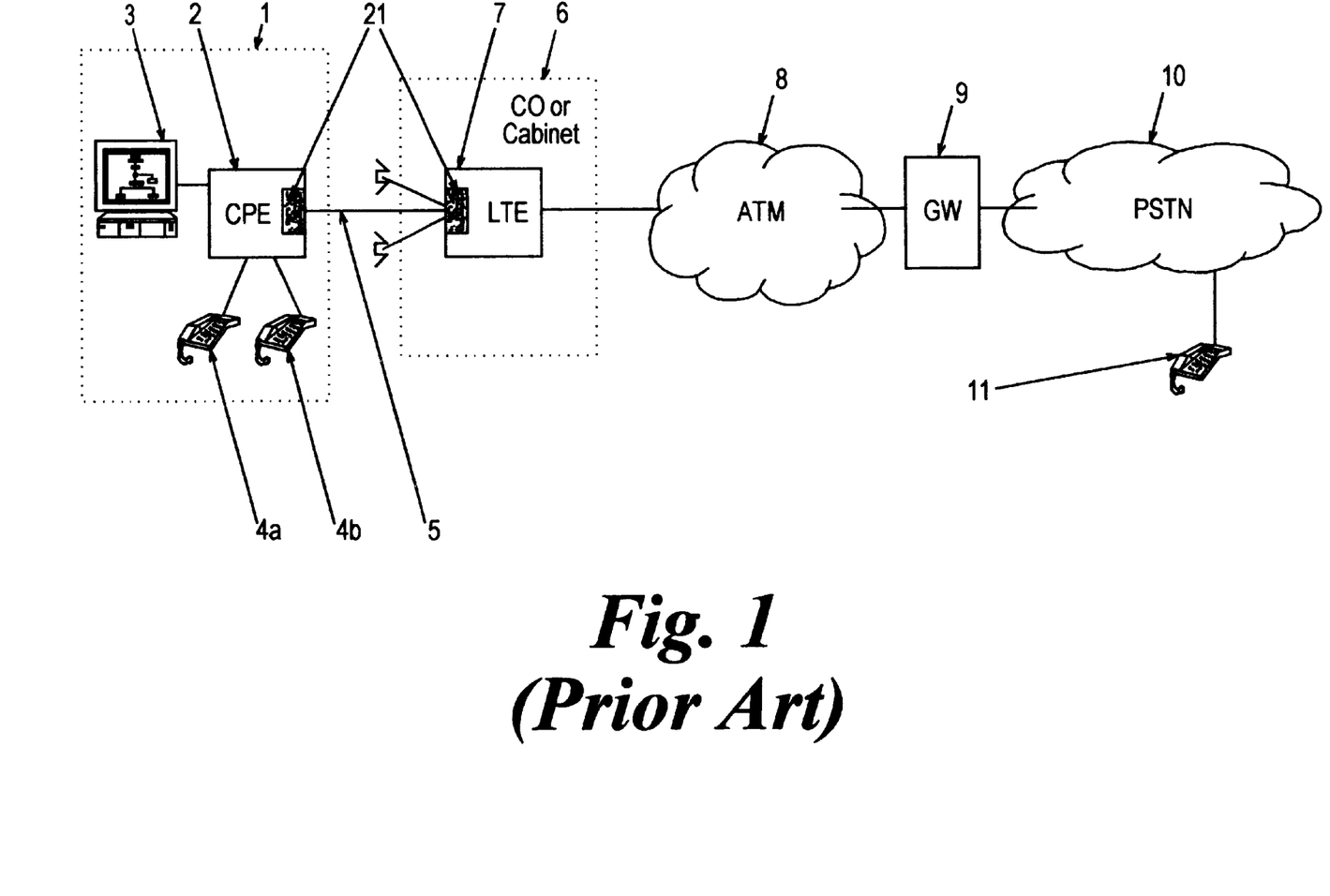
FIG. 1 shows a typical inter-connected network arrangement comprising an xDSL access network.

FIG. 1 shows a typical arrangement in which xDSL is used in a legacy access network 5 to provide multiple voice and data services to network subscribers 1. The legacy access network 5 typically comprises twisted copper pair cables, one pair running from each of a plurality of subscribers 1 to the exchange (central office) or cabinet 6. By installing suitable xDSL Line Terminating Equipment (LTE) 7 at the exchange or cabinet 6 and xDSL Customer Premises Equipment (CPE) 2 at subscriber premises 1, subscribers 1 are able to obtain multiple voice 4 and/or data 3 services over the single twisted copper pair cable or line 5 originally dedicated to them by the network operator.

The subscriber's voice 4 and data 3 channels are typically ATM virtual circuits or packet switched cells which are transferred across the access network 5 using xDSL modems 21 at the CPE 2 and the LTE 7. ATM virtual circuits are formed between the ATM interface or (shown in FIG. 2) gateway 24 or 23 to the subscriber's phone 4 or PC 3 respectively and another gateway 9 to for example the Public Switched Telephone Network (PSTN) 10. ATM cells of the virtual circuits are sent across the access network 5 using an xDSL modem 21 which converts the ATM cells into xDSL signals which in turn are interpreted by a corresponding xDSL modem 21 at the exchange LTE 7. The recovered ATM cells are sent on to the virtual circuit termination point at the PSTN gateway 9 for example. Similarly, ATM cells in a virtual circuit terminating in one of the ATM interface to one of the subscriber's communications appliances 3 or 4 are converted into xDSL signals for transmission over the access network 5 from the LTE 7 to the subscriber's CPE 2. In this way, a call may be established between for example one of the subscriber's voice phones 4a and another voice phone 11 on the PSTN 10.

Figure 2:
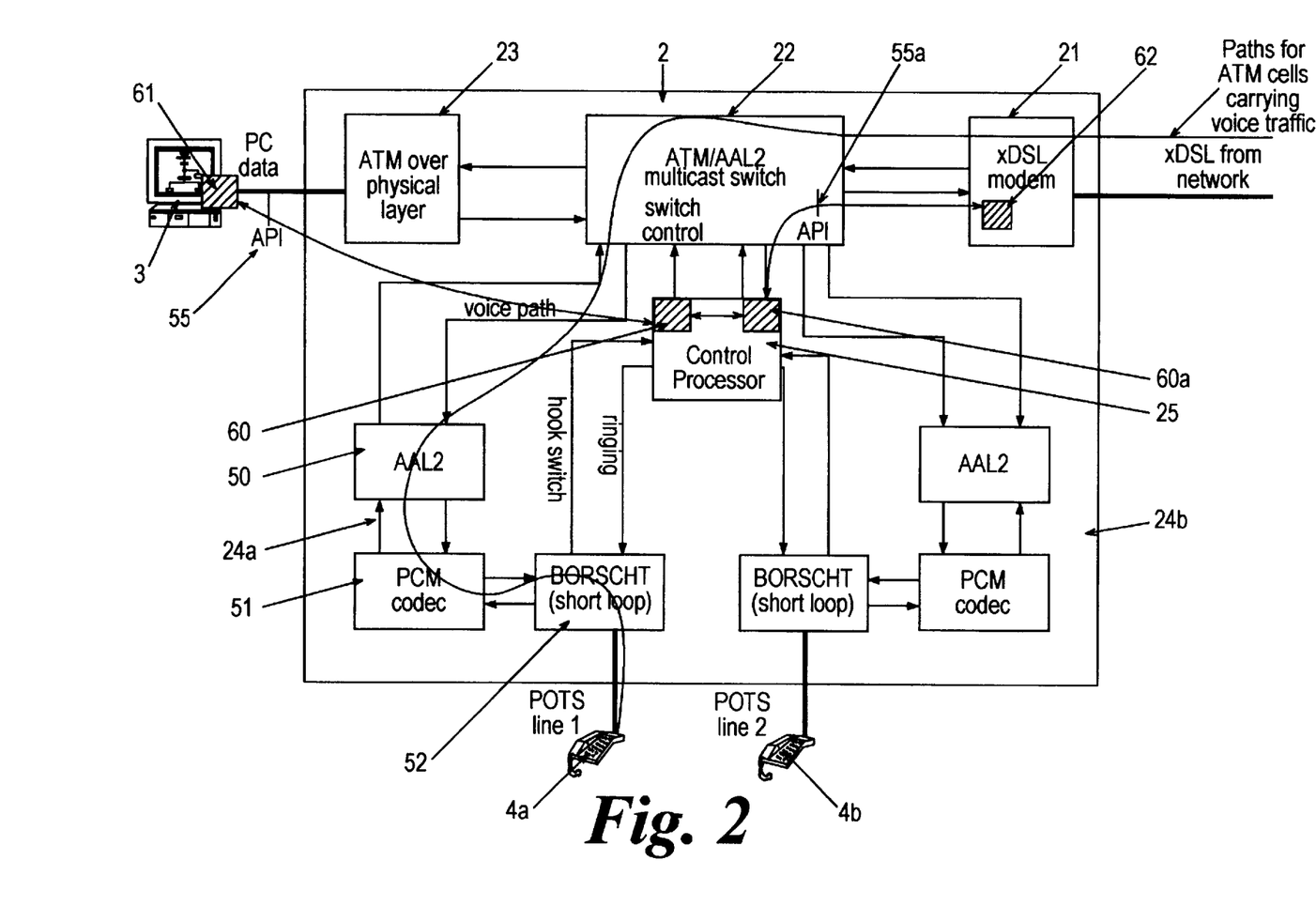
FIG. 2 is a schematic diagram of an internal architecture for VoDSL Customer Premises Equipment (CPE).

FIG. 2 shows an example Voice-over DSL (VoDSL) CPE 2 internal architecture and external connections arrangement. The CPE 2 comprises an xDSL modem 21, an ATM switch 22 which forms part of the internal packet switched network, a controller or control processor 25, two network-telephony or ATM-POTS interfaces 24a and 24b; and a data interface 23 such as an ethernet interface for example. It will be appreciated that FIG. 2 illustrates functional blocks and processes, rather than individual physical components. The control processor function 25 may be implemented on the same physical silicon as other functions in the CPE for example.

The Ethernet interface 23 provides for a connection to a subscriber PC 3 and/or other subscriber data appliances such as further PCs or a set-top box. Other data protocols could alternatively be used, for example ATM-25, IEEE 1394 or Universal Serial Bus. As a further alternative, the PC 3 may be directly connected to the ATM network if suitably terminated.

The ATM-POTS interfaces 24a and 24b convert analogue voice and DTMF (Dual Tone Multi-Frequency) dialing signals from the subscriber's voice phones 4a and 4b into ATM cells for a virtual circuit and vice versa. In a referred arrangement, the ATM-POTS interfaces 24 each comprise an AAL2 transceiver 50, a PCM codec 51, and a Borscht circuit 52. The BORSCHT circuit (Battery, Over-voltage protection, Ringing, Supervision, Coding, Hybrid, Test) is a known function which provides a physical interface to a standard analog telephone handset. In addition to a bi-directional channel carrying voice traffic, the BORSCHT function provides a logical signal "hook switch" indicating whether the telephone receiver is lifted, and accepts a logical signal "ringing" to ring the bell (or equivalent alerting device). the BORSCHT circuit also incorporates a PCM codec 51 which generates a sampled digital representation of the user's speech and accepts a sampled digital representation of the user's speech and accepts a sampled digital signal to drive the telephone earpiece.

Because of its relative simplicity and low cost implementation, ATM is the preferred layer 2 or link layer protocol. However other protocols capable of transporting the required information across the network connection, for example Internet Protocol (IP), may also be used. Corresponding POTS interface equipment 24 or gateways and data interface equipment 23 being implemented as required.

Typically, phone calls originating from one of the voice phones 4 will generate DTMF tones indicating the called number. The control processor 25 allocates a virtual circuit between the ATM-POTS interface 24 and the Gateway 9 to the PSTN, the DTMF tones being loaded into ATM cells for transport across the access network 5 via the xDSL modems 21 in the same way as speech samples later in the call. These DTMF tones are interpreted by the telephony switch forming the local interface to the PSTN 10 which routes the call to the requested destination. The request for a virtual circuit through the exchange or cabinet 6 to the gateway 9 is typically identified by recognising a hook switch event at the subscriber's phone 4—that is when the subscriber picks the phone hand piece to dial an external number, an ATM virtual circuit is allocated between the ATM-POTS interface 24 and the gateway 9.

It is a preferred implementation of VoDSL using ATM to encapsulate the information in the AAL2 (ATM Adaptation Layer 2—as defined in ITU-T Recommendation I.363.2) ATM encapsulation scheme, which allows for an additional level of addressing.

The control processor 25 is arranged to enable and disable virtual circuits by controlling the ATM switch 22. The control processor is also arranged to identify hook switch events on any of the subscriber's phone 4, and additionally receives ringing messages from the exchange and signals the BORSCHT function 52 to provide a ringing signal when appropriate to each of the voice phones 4. The xDSL modem 21 transmits and receives the ATM cells over the access network 5 using an xDSL physical-layer modulation scheme. Any suitable xDSL technology may be employed, for example HDSL, ADSL, or VDSL.

Functionally, the subscriber's CPE 2 provides high speed data access to a PC for example as well as a number of POTS lines 4a and 4b for example, each with a different number. All data and voice channels are provided over the same twisted pair copper cable 5. While the specific CPE 2 architecture described shows a single high speed data access point and 2 POTS access points 24a and 24b, numerous other combinations are possible including multiple data access points and numerous POTS access points.

VoDSL functionality is advantageous in encouraging subscribers to adopt xDSL technology, as it is a significant improvement over what is available over the previous single POTS channel historically provided or the more recent multiple narrow band ISDN technology. Additionally, where copper access pairs are scarce, and with the increasing demand for more access lines to customer premises, VoDSL allows operators to meet increased demand for high speed data and multiple telephone lines without installing additional copper.

This invention provides a method of achieving cross-layer cognisance, between the physical (DSL) layer and higher layers such as voice calls over ATM. This cross-layer cognisance allows for the improvement of the performance of the VoDSL system, specifically by limiting the impact of physical-layer-specific operations and processes on the quality of and interruptions to derived voice calls integrated over the xDSL bearer.

Layers refer generally to the 7 layers of the Open Standards Interconnection (ISO) model from the International Standards Organization (ISO). This is a well known approach to partitioning functionality of end-to-end communications in telecommunications systems. Variations on this 7 layer model are also well known and used, for example in IP and ATM networks, and for the purposes of this specification, layers refers to this general approach to modeling functionality in communications networks.

The invention provides an inventive CPE 2 architecture comprising an Application Programmers Interface (API) enabling function 60(a). The API enabling function is associated with the control processor 25 and comprises software adapted for the CPE 2 environment which is adapted to communicate via a predetermined protocol with a corresponding API-enabling function 62 normally resident in the xDSL modem 21. Together the API enabling functions 60(a) and 62 form an API 55(a) between the modem 21 and the control processor 25 of the CPE 2 which allows the control processor 25 to obtain information on and send information and certain operating parameters to the modem 21.

The API 55(a) is preferably enabled using an ATM virtual circuit between the control processor 25 and the modem 21. Control signals may then be transferred across this path between the modem 21 and the control processor 25 using the protocol adopted by the API enabling functions 60(a) and 62. The API 55(a) so formed allows the control processor to influence operation of the modem 21, and vice-versa.

As an alternative, the API 55(a) may be implemented over a direct connection between the modem 21 and control processor.

The control processor 25 has access to information about ATM virtual circuits controlled by the ATM switch 22, for example:

ATM buffering
Queue lengths
The type of information on the virtual circuit e.g. voice or data,
Whether information being passed along VC at present; the control processor 25 also has access to information such as the hook state of the various subscriber phones 4.
Incoming call requests from the PSTN.

This invention provides a method of achieving cross-layer cognisance, between the physical (DSL) layer and higher layers such as voice calls over ATM. This cross-layer cognisance allows for the improvement of the performance of the VoDSL system, specifically by limiting the impact of physical-layer-specific operations and processes on the quality of and interruptions to derived voice calls integrated over the xDSL bearer.

The available data rate offered by a given DSL link depends on many attributes of the physical environment, and is available with a given margin (typically quoted in dB). This margin can be eroded with time, due to changing conditions on the line. Additionally, the signal to noise ratio (SNR) varies according to the frequency, and can vary with time. In a multi-carrier modulation scheme, such as DMT (Discrete Multi Tone), the number of bits allocated per carrier depends on the available SNR, which can vary with time as described, because of changing line conditions and external interference sources.

The DSL modem 21 has access to information about the physical line 5 or DSL access link such as:

the allocation of bits to carriers
The status of the margin.
Whether a re-train of the modem is required The API 55(a) allows messages related to the above described information to be passed from the DSL modem 21 to the control processor 25. The control processor 25 is configured to request information from the modem 21 and utilise this together with information from the ATM switch 22 to provide a number of performance enhancements as described below. These performance enhancements are implemented by instructions sent over the API 55(a) to the modem 21 which in turn controls the modems operations. The control processor 25 can also, upon request from the xDSL modem 21 by means of messages across the API 55(a) transfer messages to the xDSL modem carrying information about, for example, the state of voice and data calls in progress.

As a further enhancement, the subscriber's PC 3 may be used to implement some, all, or additional performance enhancements, by acting on the modem 21 and switch 22 information collected and sent by the control processor 25. This information together with instructions from the PC 3 to the modem 21 via the control processor 25 are forwarded across an additional API 55 linking the PC 3 and control processor 25.

The additional API 55, (Application Programmers Interface) is derived from API enabling functions 60 and 61 associated with the control processor 25 and PC 3 respectively. The additional API 55 allows an attached PC 3 to exchange information with the control processor 25 in the CPE. This allows optional software in the PC 61 to control "primitive" operations in the CPE 2 to implement a more complex suite of services. In the absence of this software 61 PC 3 using the API 55, the control processor 25 on the CPE2 implements a standard basic set of functions optimising the performance of the VoDSL system.

The API enabling functions 60, 60(a), 61 and 62, and the additional control processor functionality are preferably implemented in software.

When using DSL to transport derived (embedded) voice, there are several conceivable scenarios where the ability to set up or maintain a call is compromised by the physical-layer conditions, and where actions performed by the modem at the physical layer can impact on the services at higher layers (such as voice calls). As an example, changing physical-layer conditions can require an xDSL modem to re-train, causing the modem link to be temporarily broken. This results in the termination of any derived VoDSL voice-calls in progress at the time. As a further example, it is known that G.Lite (ITU G.992.2) can be required to undergo frequent "fast-retrains" initiated for example by hook-events from a telephone using the same in-premises wiring and using the baseband channel to the exchange, as supported bt G.Lite. Such events can lead to frequent termination of the derived integrated voice calls in progress, significantly impacting on the quality of service for those calls.

The invention provides cross-layer cognizance to improve on this problem. The benefits of the cross-layer communication can be regarded in terms of additional enabled features or improved performance for VoDSL enabled by such visibility between the layers.

There are two aspects to the methods described herein.

1. Impact of lower layers on higher layers.

Where bandwidth resource is scarce, the use of the available bandwidth for embedded voice-calls can be optimized to support the required calls with the best quality through cross-layer communication.

This provides mitigation of some causes of compromise of embedded voice calls carried within DSL systems (i.e. VoDSL) caused by actions at other layers, and additional benefits due to visibility of actions at other layers.

For example, for narrowband call admission control with variable resource (bandwidth) available to the narrowband calls, optimisation of calls as they come and go requires cross-layer communication.

With AAL2, all the voice lines are typically supported by one CPE over a single VC. The attributes of this VC will include a guaranteed bandwidth (e.g. 150kbits/s). This is available whenever needed. Additionally, the VC can have a Peak Cell Rate (PCR), which can be significantly higher than can be normally supported, for example whilst other VCs are carrying, for example, data traffic.

When the remaining bandwidth of the DSL link is not being used by data, the system can be configured such that available bandwidth is "stolen" by the voice VC. This requires visibility and communication from the lower (ATM) layer to the higher layers of call-admission and control. Effectively this is accomplished by the voice telephony VC utilising the full required capacity of the DSL link whilst it can, which requires cross-layer communication not normally available in such a system.

The following example illustrates how cross-layer communication is used to enable enhanced voice-quality for derived VoDSL voice calls. The admission of calls can be accepted freely (at e.g. 64 kbits/s) while the guaranteed bandwidth is not exceeded. However, when the number of calls in progress requested exceeds those that can be supported by the guaranteed resource at the nominal bit-rate, additional measures are taken to support the calls required. These measures include for example first the inclusion of silence suppression of one or more calls, and subsequently the increased use of compression. Whilst this process may be managed smoothly to give minimum perceived impact on the quality of the voice calls, there is nonetheless an impact on the quality of the delivered voice connections resulting from increased compression and silence suppression. The impact on voice quality can, however, be minimised by limiting the degree of silence suppression and compression by utilising information from the ATM layer regarding the other VCs using the DSL link at a given time. This requires management of the link (ATM) layer to be controlled for the voice VC according to the demands at higher (voice admission control) layers, and is achieved through visibility of the link (ATM) layer allocation to other (data) services. The management of the ATM VC carrying the voice traffic has visibility of higher layer usage not only for the voice calls, but for data-traffic and other traffic in other ATM VCs.

In the above example, layer 3 and higher processes controlling voice call coding and presentation benefit from information from the lower (ATM) layer about available bandwidth. Furthermore, the ATM layer controlling the voice VC has information about the utilisation of other ATM VCs for the system, such as those carrying data.

A further example is for a VoDSL system with G.lite as the DSL where retraining (e.g. fast-retrain) of the modem is in progress when a call request is received by the admission call control function. Communication between the lower (physical) layer is such that the CPE 2 can be configured such that the call is accepted in the knowledge that even though the link is currently not available, it will be available within a few seconds (the time taken to perform a fast retrain). Optionally, this is presented to the calling party as a ringing during the remaining period of retraining (signalled by the LTE for external PSTN calls and by the CPE for calls from a CPE phone), with the actual call connection established on completion of training.

2. Impact of higher layers on lower layers.

Where required physical-layer actions can compromise the quality of integrity of the embedded voice calls, cross-layer communication from higher layers enables these physical layer actions to be made in a manner that reduces the impact on the embedded voice calls.

The available data rate offered by a given DSL link depends on many attributes of the physical environment, and is available with a given margin. This margin can be eroded with time, due to changing conditions on the line, and when the margin has been reduced to a first threshold level, the modem will undergo a retrain, where the DSL link is broken for the duration of the retrain. This will result in the interruption (and normally termination) of any embedded voice calls in progress on the DSL link for a VoDSL system.

The invention provides a number of service or performance enhancements based on cross layer cognizance.

Figure 3:
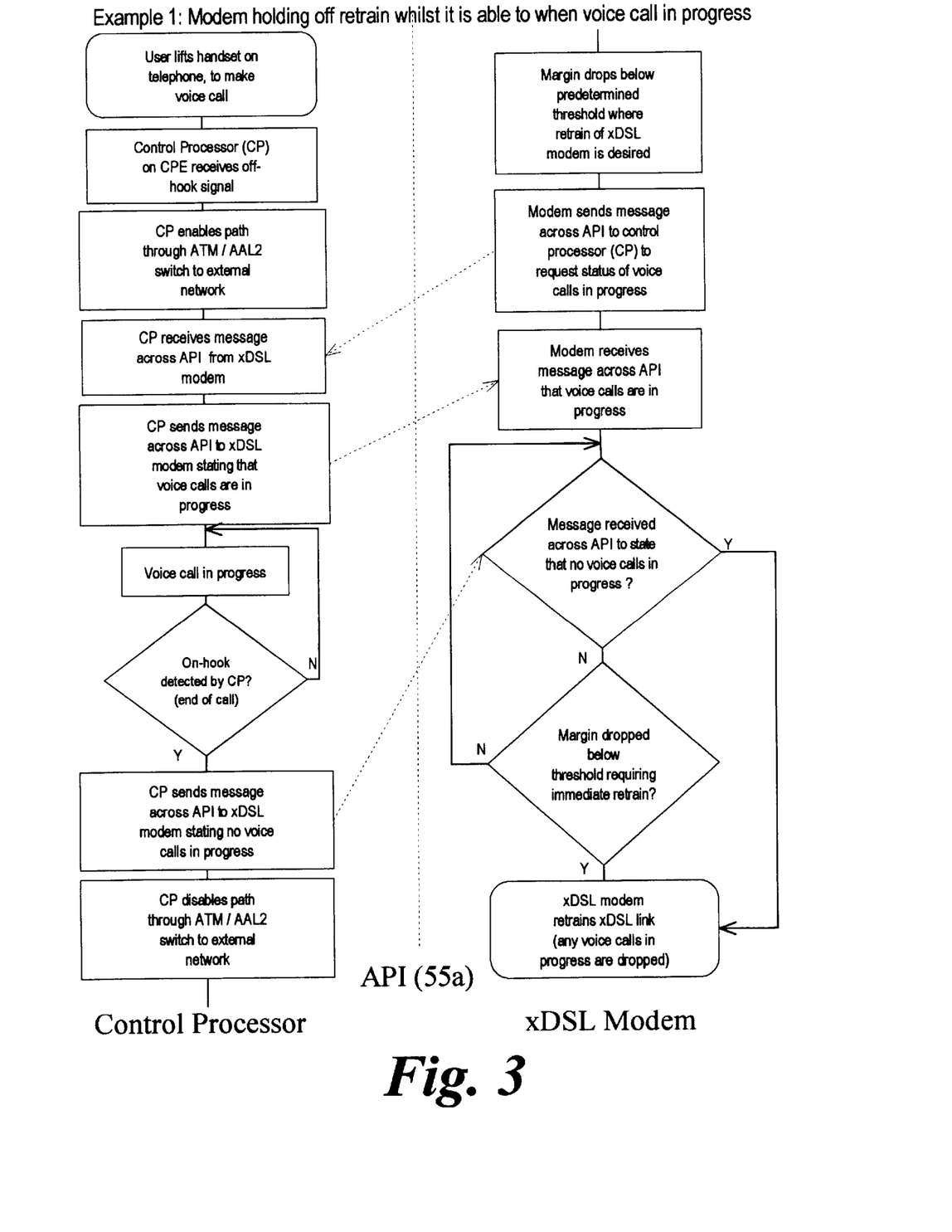
FIG. 3 is a flow diagram showing a modem holding off retrain whilst is able when a voice call is in progress.

For example, referring to FIG. 3, when the VoDSL system is loosing margin over time, due to variation in physical-layer conditions, the xDSL modem 21 is instructed to hold-off retraining to the last possible moment and then actively choose to do so when instructed (through cross-layer cognizance) that there are no voice-calls carried in the payload. This gives the voice call in progress the maximum chance of finishing un-interrupted. This is achieved because the first threshold in margin where a modem will retrain may be higher than a second threshold level, the minimum marginal lowing operation of the modem.

In a further alternative the modem 21 is instructed by the control processor 25 to retrain when margin is lower than optimum, but still higher than the threshold normally causing retrain. The control processor 25 informs the xDSL modem 21 that such a retrain is possible, using messages exchanged across the API 55(*a*), when the control processor 25 knows that no integrated voice calls are in progress.

In an extreme case, if retain becomes necessary during a voice call, retrain may be configured to start in a pause in speech. This instance can be communicated to the xDSL modem across the API 55(*a*) by the control processor 25.

This kind of selective retraining illustrated in the examples above, which relies on the physical-layer management associated with the xDSL modem 21 understanding the nature of the payload traffic through exchange of messages with the control processor 25 across an API 55(*1*), significantly reduces the impact of retraining on the integrated voice, whilst subjecting only data with a greater latency/retransmission tolerance to the interruptions.

In a further enhancement when a call request is made, if the system decides it is short of margin, it may be configured to perform a fast-retrain where this is supported (as it is on G.992.2 today). This delay of a few seconds can be absorbed by presenting ringing to the calling party.

The following services are also configurable in the inventive CPE architecture:

A dynamically adjusted data rate across the DSL system according to the nature and demands of the traffic. In the case of voice traffic carried in the fast channel, the bit allocation can be modified to give a higher capacity at a lower margin or BER. This is done on the basis that the DSL requirements (typically BER=1e-7 at 6 dB) are over specified for voice traffic. This may only be necessary at times of congestion or may be an assumed fixed adjustment for voice traffic. This is possible only when the physical layer knows specific information about the nature of the layer 3 traffic (i.e. that it is voice).

A flexibility in the allocation of error correction overhead. Here the overhead may be reduced for a fast channel carrying voice traffic in order to liberate more channel capacity, albeit with a lower margin or increased BER. This may also require a corresponding change to the criteria for modern re-train initiation.

The inventive CPE 2 architecture also provides the subscriber with the ability to interrogate the DSL modem 21 as to its current operating parameters. This may be used for diagnostic purposes for example, and to optimize performance of the modem. This facility may also be provided across the access network 5, such that a computing facility at the exchange for example, is able to access and reconfigure the DSL modem 21.

As a further enhancement the modem 21 is configured to include an ADSI modem in order to receive DTMF tones from a subscriber phone 4 and to forward ADSI messages to the pone 4. This allows for enhanced "in-premises" diagnostic and control services. Reference is made to applicants co-pending application of the same date and titled "Enhanced VoDSL Service Provision".

The use of cross layer cognizance within the CPE-end of the xDSL link has been used to illustrate the invention. The invention is not, however, limited to the CPE, and applies to both ends of the xDSL link, including the LTE at the exchange or cabinet 6.

The method also extends to cover cases where CPE and LTE co-operate to provide cross-layer communication (for example, communication between a lower layer at the CPE and a higher layer at the LTE).

The service quality associated with the presentation of derived VoDSL voice-channel can be limited by events at the physical layer, and by constraints of a bandwidth across the access segment shared with data-services. Visibility of state between the physical, ATM and voice-service control layers can improve quality and presentation of these embedded voice channels to better meet the toll-grade voice requirements.

Further examples of how cross-layer communication can improve Quality of Service Include:

This contribution proposes a mechanism to achieve the following:

Enhance voice QoS by coupling management of ADSL margin and retraining with voice-packetisation, coding and call-state.

Enhance voice QoS by minimising degree of voice-compression dynamically by exploiting bandwidth nominally allocated to the data traffic (when data-services utilise less than their allocated bandwidth).

Enhance data-service QoS by enabling extra voice compression to alleviate data-channel congestion whilst preserving minimum voice-service requirements.

In addition to voice-service improvement, cross-layer cognizance and communication can be used to reduce data-congestion across the xDSL link where the available voice-connections are under-utilized.

Once a voice call is accepted, silence suppression and compression can also be invoked to release as much data capacity as possible, with the goal of optimising the service mix where there is upstream packet-loss. With cross-layer communication, this process can be limited to instances when data throughput is high. PFQ and RED (Random Early Detection) typically work on a hierarchy of proactive steps based upon queue depth, which could map to varying degrees of compression and silence suppression.

Figure 4:
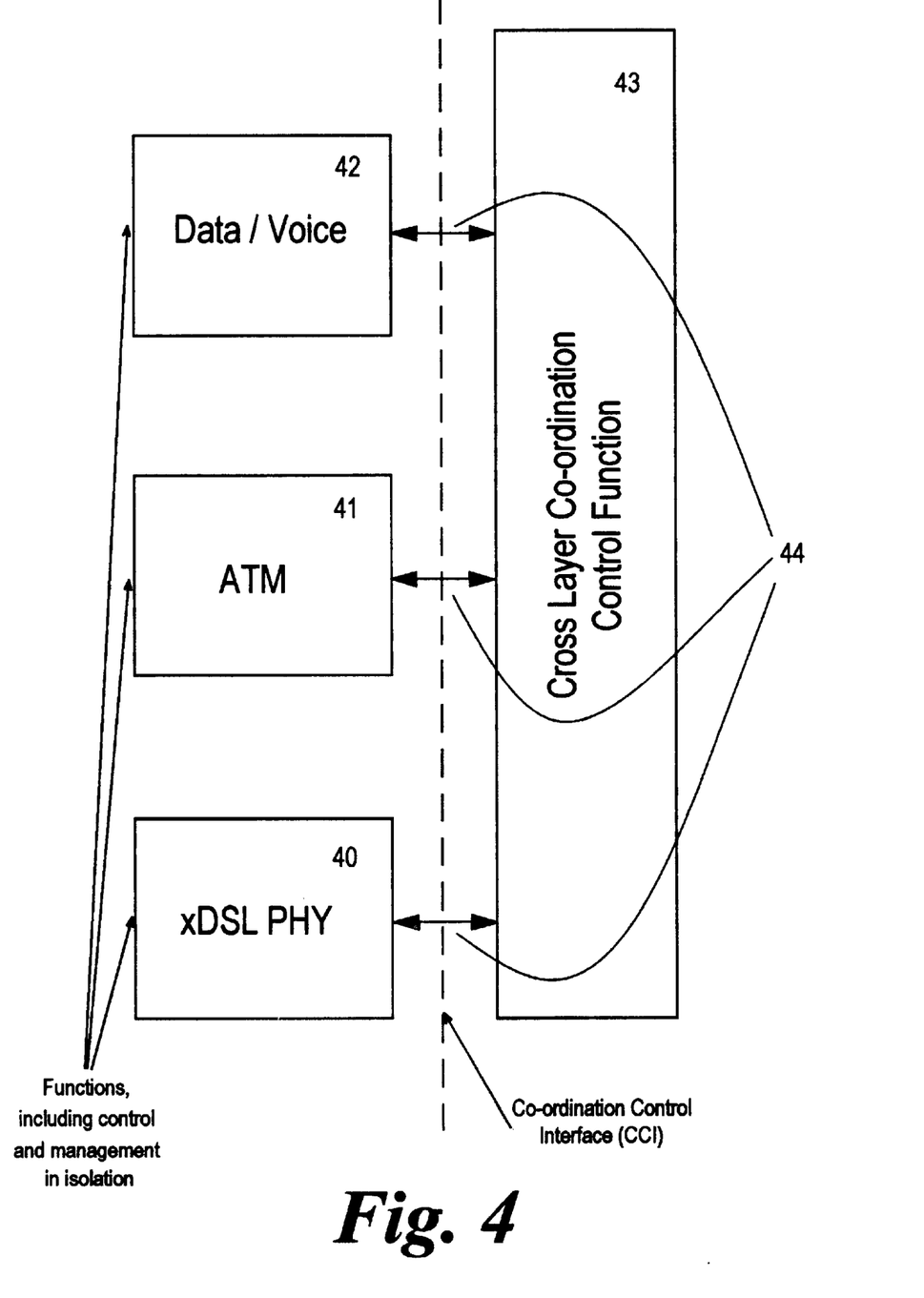
FIG. 4 is a cross-layer communication between a xDSL modem, ATM and voice control functions.

Referring now to FIG. 4, cross-layer communication as described may utilise messages 44 passed between the xDSL modem PHY 40, ATM 41, and voice control 42 functions. This can be represented by a cross-layer co-ordination control 43 function. Messages between the isolated control functions for the various layers can pass to/from the co-ordination control function across a Co-ordination Control Interface (CCI).

Figure 5:
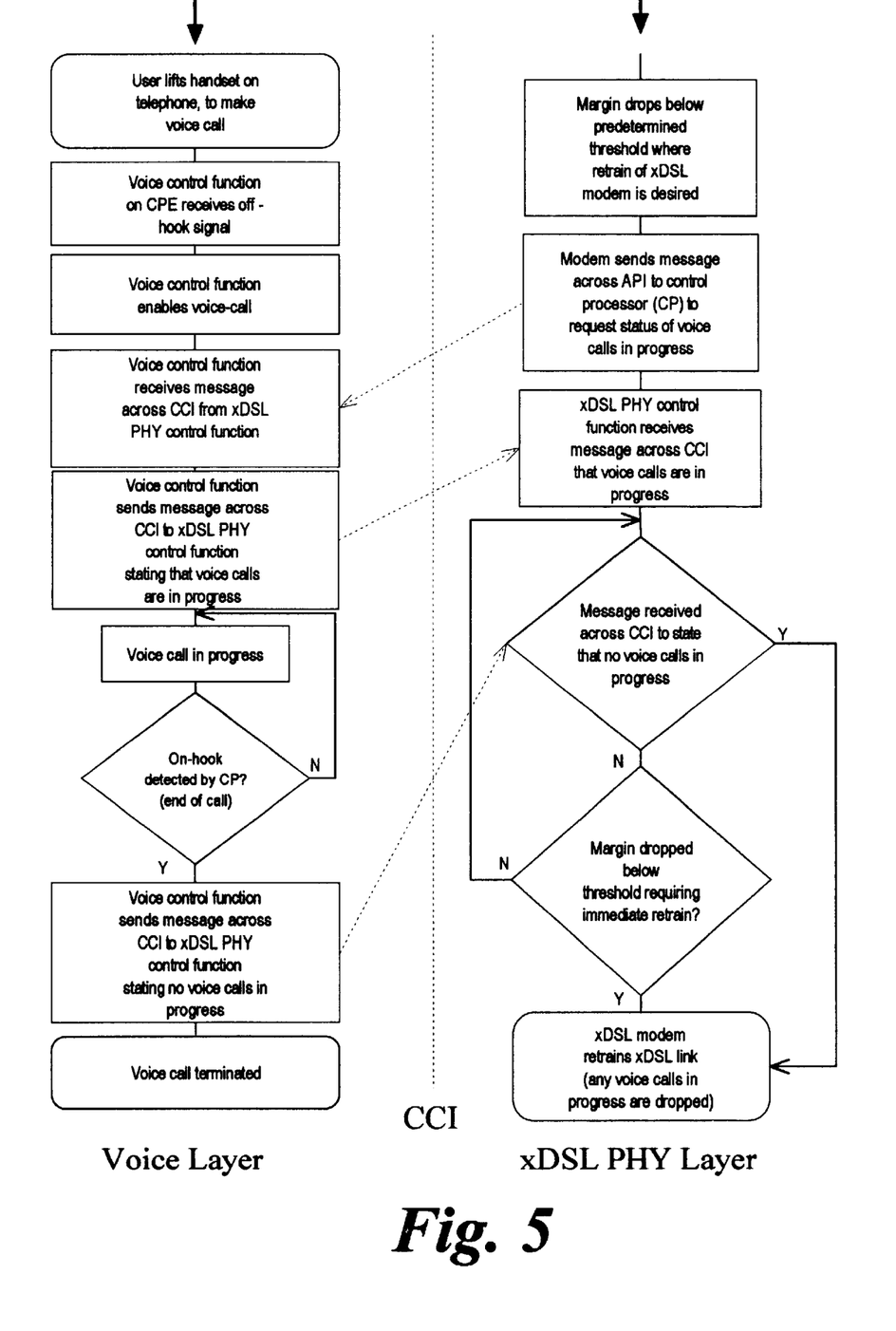
FIG. 5 is a cross-layer communication functional structure used to limit the impact of physical-layer-specific operations, processes and interruptions.

FIG. 5 shows a simple example of how cross-layer communication described by such a functional structuring can be used to limit the impact of physical-layer-specific operations and processes on the quality of, and interruptions to, derived voice calls carried over the xDSL bearer. The scheme shown is analogous to that of FIG. 3, but generalises the method away from specific hardware configurations in favour of a functional structuring.

While the invention has been described with reference to a VoDSL system, other digital access systems (DAS) can alternatively be used—for example optical, E1, and data modem over coax as in cable TV.

The foregoing describes the invention including preferred forms thereof. Alternations and modifications as would be obvious to those skilled in the art are intended to be incorporated within the scope hereof.

What is claimed is:

1. Digital Access System (DAS) Customer Premises Equipment (CPE) comprising:
    an internal packet switched network comprising a switch;
    a DAS modem connected to said internal network and arranged such that in use the internal network is coupled to an external packet switched network by a DAS link over an access network;
    a controller arranged to control said switch in order to establish packet transfer paths between said modem and one or more internal network interfaces to customer appliances connected to the CPE in order to complete calls between said appliances and entities on the external network;
    and means for enabling cross-layer cognizance between the modem and the controller, the means being arranged to reconfigure parameters corresponding to a first layer dependent on parameters corresponding to a second layer.

2. A CPE as claimed in claim 1, wherein said DAS is Voice over Digital Subscriber Line (VoDSL).

3. A CPE as claimed in claim 2 wherein one of said layers is the physical layer.

4. A CPE as claimed in claim 1 wherein the means for enabling cross-layer cognizance is arranged to optimize quality of service for one or more derived digital embedded voice calls carried by said DSL link CPE performance.

5. A CPE as claimed in claim 4 wherein said cross-layer cognizance means comprises means for forwarding packet transfer path and/or voice call state information from the controller to the modem and forwarding DSL link information from the modem to the controller.

6. A CPE as claimed in claim 5 wherein said forwarding means comprises an application programmers interface enabling function associated with the modem and a corresponding application programmers interface enabling function associated with the controller which together form an application programmers interface (API).

7. A CPE as claimed in claim 6 wherein said API is established over a packet transfer path on said internal network.

8. A CPE as claimed in claim 5 wherein said cross-layer cognizance means comprises a computer function arranged to reconfigure the modem and the controller dependent on said forwarded information.

9. A CPE as claimed in claim 8, wherein said CPE comprises said computing function.

10. A CPE as claimed in claim 8, wherein said computing function is external to said CPE.

11. A CPE as claimed in claim 10, wherein said computing function is associated with a Personal Computer connected to said network-data interface.

12. A CPE as claimed in claim 2, wherein said controller is a control processor.

13. A CPE as claimed in claim 2, wherein one of said layers is the link layer.

14. A CPE as claimed in claim 13, wherein one of said link layers is ATM.

15. A CPE as claimed in claim 2, wherein one of said layers is a layer corresponding to end to end voice call control and admission across said DSL link.

16. DAS Line Terminating Equipment (LTE) comprising:
   an internal packet switched network comprising a switch and forming part of an external packet switched network;
   a DAS modem connected to said internal network and arranged such that in use the internal network is coupled to a Customer Premises Equipment (CPE) internal packet switched network by a DAS link over an access network;
   a controller arranged to control said switch in order to establish packet transfer paths between said modem and gateways or destinations on the external network;
   wherein the LTE is arranged to reconfigure parameters corresponding to a first layer dependent on parameters corresponding to a second layer.

17. A LTE as claimed in claim 16, wherein said DAS is VoDSL.

18. A LTE as claimed in claim 17 wherein one of said layers is the physical layer.

19. A LTE as claimed in claim 18 further comprising means for enabling cross-layer cognizance between the modem and the controller in order to optimize LTE performance.

20. A LTE as claimed in claim 17, wherein one of said layers is the link layer.

21. A LTE as claimed in claim 20, wherein one of said link layers is ATM.

22. A LTE as claimed in claim 17, wherein one of said layers is a layer corresponding to end to end voice call control and admission across said DSL link.

23. An access network comprising:
   a physical medium connecting DAS Line Terminating Equipment (LTE) to Customer Premises Equipment (CPE);
   said LTE comprising:
      an internal packet switched network comprising a switch and forming part of an external packet switched network;
      a DAS modem connected to said internal network and arranged such that the internal network is coupled to a CPE internal packet switched network by a DAS link over said physical medium;
      a controller arranged to control said switch in order to establish packet transfer paths between said modem and gateways or destinations on the external network;
      wherein the LTE is arranged to reconfigure parameters corresponding to a first layer dependent on parameters corresponding to a second layer; and
   said CPE comprising:
      said CPE internal packet switched network comprising a CPE switch;
      a CPE DAS modem connected to said CPE internal network and arranged such that the CPE internal network is coupled to said external packet switched network by said DAS link over said physical medium;
      a CPE controller arranged to control said CPE switch in order to establish packet transfer paths between said CPE modem and one or more internal network interfaces to customer appliances connected to the CPE in order to complete calls between said appliances and entities on the external network;
      wherein the CPE is arranged to reconfigure parameters corresponding to a third layer dependent on parameters corresponding to a fourth layer.

24. An access network as claimed in claim 23, wherein said DAS is VoDSL.

25. An access network as claimed in claim 24, wherein said third layer is said first or second layer and wherein said fourth layer is said second or first layer.

26. A method of operating a VoDSL CPE or LTE comprising:
   an internal packet switched network comprising a switch;
   a DSL modem connected to said internal network and arranged such that in use the internal network is coupled to an external packet switched network by a DSL link over an access network;
   a controller arranged to control said switch in order to establish packet transfer paths between said modem and one or more internal network interfaces to customer appliances connected to the CPE in order to complete calls between said appliances and entities on the external network;
   the method comprising:
      determining parameters corresponding to a first layer;
      reconfiguring parameters corresponding to a second layer dependent on said first layer parameters.

27. A method of operating a VoDSL CPE or LTE for delaying modem retraining when voice calls in progress, said CPE comprising:
   an internal packet switched network comprising a switch;
   a DSL modem connected to said internal network and arranged such that in use the internal network is coupled to an external packet switched network by a DSL link over an access network;
   a controller arranged to control said switch in order to establish packet transfer paths between said modem and one or more internal network interfaces to customer appliances connected to the CPE in order to complete calls between said appliances and entities on the external network;
   the method comprising:
      determining whether the margin has fallen below a first predetermined threshold;
      if so, determining whether voice calls are in progress:
         is not, begin retraining the DSL modem;
         if, so determining whether margin has fallen below a second predetermined threshold;
            if so, begin retraining the DSL modem.

28. A digital Access System (DAS) Customer Premises Equipment (CPE) comprising:

a Digital Subscriber Loop (DSL) physical layer;

a packet switching layer; and a data/voice layer, wherein said CPE is arranged to reconfigure parameters corresponding to a first of said layer dependent on parameter corresponding to a second of said layer.

29. A DAS Line Terminating Equipment (LTE) comprising:

a Digital Subscriber Loop (DSL) physical layer;

a packet switching layer; and a data/voice layer, wherein said CPE is arranged to reconfigure parameters corresponding to a first of said layer dependent on parameter corresponding to a second of said layer.

30. A DAS network comprising CPE and LTE each comprising:

a Digital Subscriber Loop (DSL) physical layer;

a packet switching layer; and a data/voice layer, wherein said network is arranged to reconfigure parameters corresponding to a first layer of one of said CPE and LTE dependent on a parameter corresponding to a second layer of one of said CPE and LTE.

* * * * *